US010567693B2

(12) United States Patent
Suzuki et al.

(10) Patent No.: US 10,567,693 B2
(45) Date of Patent: Feb. 18, 2020

(54) VIDEO OUTPUT APPARATUS AND VIDEO OUTPUT METHOD

(71) Applicant: Panasonic Intellectual Property Management Co., Ltd., Osaka (JP)

(72) Inventors: Taro Suzuki, Kanagawa (JP); Daisuke Kusaba, Osaka (JP); Toshihiro Takagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/461,867

(22) PCT Filed: Nov. 20, 2017

(86) PCT No.: PCT/JP2017/041589
§ 371 (c)(1),
(2) Date: May 17, 2019

(87) PCT Pub. No.: WO2018/097076
PCT Pub. Date: May 31, 2018

(65) Prior Publication Data
US 2019/0373203 A1    Dec. 5, 2019

(30) Foreign Application Priority Data

Nov. 28, 2016   (JP) .................................. 2016-230609

(51) Int. Cl.
*H04N 5/44*           (2011.01)
(52) U.S. Cl.
CPC ..... *H04N 5/4403* (2013.01); *H04N 2005/443* (2013.01); *H04N 2005/4412* (2013.01); *H04N 2005/4439* (2013.01)
(58) Field of Classification Search
CPC ................................ H04N 5/4403; H03J 9/00
(Continued)

(56) References Cited

U.S. PATENT DOCUMENTS

| 5,774,063 A * | 6/1998 | Berry ...................... G06F 3/023 |
| | | 340/4.37 |
| 6,469,633 B1 * | 10/2002 | Wachter ................. G08C 17/02 |
| | | 340/12.5 |

(Continued)

FOREIGN PATENT DOCUMENTS

JP         2000-197162         7/2000

OTHER PUBLICATIONS

International Search Report of PCT application No. PCT/JP2017/041589 dated Feb. 20, 2018.

*Primary Examiner* — Jefferey F Harold
*Assistant Examiner* — Mustafizur Rahman
(74) *Attorney, Agent, or Firm* — McDermott Will & Emery LLP

(57) ABSTRACT

A video output apparatus includes an operation device that outputs an operation signal according to an operation, an operation signal processor that receives the operation signal and executes a process, and a storage that stores a plurality of programs and an association between the operation signal and any of the plurality of programs. The operation device includes a definition operation part to which a function achieved by any of the plurality of programs can be allocated, and the plurality of programs includes a function allocation setting program for outputting an operation image for allocating the function to the definition operation part. The storage stores, as an initial association, an association between an operation signal due to an operation on the definition operation part and the function allocation setting program. Upon receipt of the operation signal output from the operation device due to the operation on the definition operation part, the operation signal processor executes the function allocation setting program based on the initial association and outputs the operation image.

6 Claims, 9 Drawing Sheets

(58) Field of Classification Search
USPC .................. 348/734, 719, 714; 345/172, 169
See application file for complete search history.

(56) References Cited

U.S. PATENT DOCUMENTS

| | | | |
|---|---|---|---|
| 8,199,113 B2 | 6/2012 | Madonna et al. | |
| 2002/0112248 A1* | 8/2002 | Takagi | H04H 40/18 |
| | | | 725/131 |
| 2003/0103088 A1* | 6/2003 | Dresti | H04N 21/8543 |
| | | | 715/835 |
| 2011/0134026 A1* | 6/2011 | Kang | G06F 3/011 |
| | | | 345/156 |
| 2012/0066705 A1* | 3/2012 | Harada | H04N 21/4662 |
| | | | 725/12 |
| 2012/0260206 A1* | 10/2012 | Cipollo | H04L 41/22 |
| | | | 715/771 |
| 2013/0040623 A1* | 2/2013 | Chun | H04N 21/4126 |
| | | | 455/414.2 |
| 2015/0131008 A1* | 5/2015 | Robinson | G08C 17/02 |
| | | | 348/734 |
| 2015/0208013 A1* | 7/2015 | Friedrich | H04N 21/42215 |
| | | | 348/734 |
| 2015/0309715 A1* | 10/2015 | Higa | G06F 3/0482 |
| | | | 715/717 |
| 2016/0057374 A1* | 2/2016 | Kim | H04N 21/42203 |
| | | | 348/734 |

\* cited by examiner

FIG. 3

| Key code | Function/program |
|---|---|
| ⋮ | ⋮ |
| 02 20 80 0f 74 | Channel no. UP |
| 02 20 80 0f 75 | Channel no. DOWN |
| ⋮ | ⋮ |
| 02 20 80 0f cd | Favorite list display switching |
| 02 20 80 0f ce | Function allocation setting |
| ⋮ | ⋮ |

| Key code | Function |
| --- | --- |
| ⋮ | ⋮ |
| 02 20 80 0f 74 | Channel no. UP |
| 02 20 80 0f 75 | Channel no. DOWN |
| ⋮ | ⋮ |
| 02 20 80 0f cd | Favorite list display switching |
| 02 20 80 0f ce | More & Better CH |
| ⋮ | ⋮ |

R10

VIDEO OUTPUT APPARATUS AND VIDEO OUTPUT METHOD

CROSS-REFERENCE TO RELATED APPLICATIONS

This application is a U.S. national stage application of the PCT International Application No. PCT/JP2017/041589 filed on Nov. 20, 2017, which claims the benefit of foreign priority of Japanese patent application No. 2016-230609 filed on Nov. 28, 2016, the contents all of which are incorporated herein by reference.

TECHNICAL FIELD

The present disclosure relates to a video output apparatus and a video output method for displaying a video or for outputting a signal for enabling an external device to display a video, according to an operation performed by a user.

BACKGROUND ART

PTL 1 discloses a remote controller (hereinafter, it may be referred to as a remote) for electronic devices, the remote controller having a button (hereinafter also referred to as a key) to which a function can be reallocated. The button included in the remote controller can be allocated with a function desired by a user.

CITATION LIST

Patent Literature

PTL 1: U.S. Pat. No. 8,199,113

SUMMARY

The present disclosure provides a video output apparatus and a video output method for allowing a user to easily allocate a function to a definition key.

The video output apparatus in the present disclosure includes: an operation device that outputs an operation signal according to an operation; an operation signal processor that executes a process according to the operation signal upon receipt of the operation signal; and a storage that stores a plurality of programs for achieving a plurality of functions, and an association between the operation signal and any of the plurality of programs, wherein the operation device has a definition operation part to which a function achieved by any of the plurality of programs is allocatable, the plurality of programs includes a function allocation setting program for outputting an operation image for allocating the function to the definition operation part, the storage stores, as an initial association, an association between an operation signal due to an operation on the definition operation part and the function allocation setting program, and the operation signal processor executes the function allocation setting program based on the initial association and outputs the operation image, upon receipt of the operation signal output from the operation device due to the operation on the definition operation part.

The video output method in the present disclosure is a method for outputting an image of an operation image, the method being executed by a video output apparatus including: an operation device that outputs an operation signal according to an operation and has a definition operation part to which a function achieved by any of a plurality of programs is allocatable; an operation signal processor that executes a process according to the operation signal upon receipt of the operation signal; and a storage that stores a plurality of programs including a function allocation setting program for outputting an operation image for allocating the function to the definition operation part, and an association between the operation signal and any of the plurality of programs, wherein the storage stores, as an initial association, an association between an operation signal due to an operation on the definition operation part and the function allocation setting program, and the operation signal processor executes the function allocation setting program based on the initial association and outputs the operation image, upon receipt of the operation signal output from the operation device due to the operation on the definition operation part.

The video output apparatus in the present disclosure allows a user to easily allocate a function to a definition key.

BRIEF DESCRIPTION OF DRAWINGS

FIG. 3 is a schematic diagram for describing one example of a configuration of setting data stored in a storage of the video output apparatus according to the first exemplary embodiment.

FIG. 6 is a diagram schematically illustrating an example of setting data after a user allocates a function to the key in the video output apparatus in the first exemplary embodiment.

DESCRIPTION OF EMBODIMENTS

Exemplary embodiments will be described in detail below with reference to the drawings as appropriate. However, descriptions in more detail than necessary may be omitted. For example, detailed descriptions of already known items and duplicated descriptions of substantially identical configurations might sometimes be omitted. This is to avoid unnecessary redundancy in the following description and to facilitate understanding of those skilled in the art.

The accompanying drawings and the following description are provided to help those skilled in the art to fully understand the present disclosure and are not intended to limit the subject matter recited in the appended claims.

The accompanying drawings do not necessarily reflect the actual scales, and are schematic diagrams that are simplified as appropriate for easy understanding of the present disclosure. In each of the drawings, substantially identical components are given identical reference marks, and descriptions of such components may be omitted or simplified.

First Exemplary Embodiment

A first exemplary embodiment will now be described with reference to FIGS. 1 to 6.

[1-1. Outline]

Figure 1:
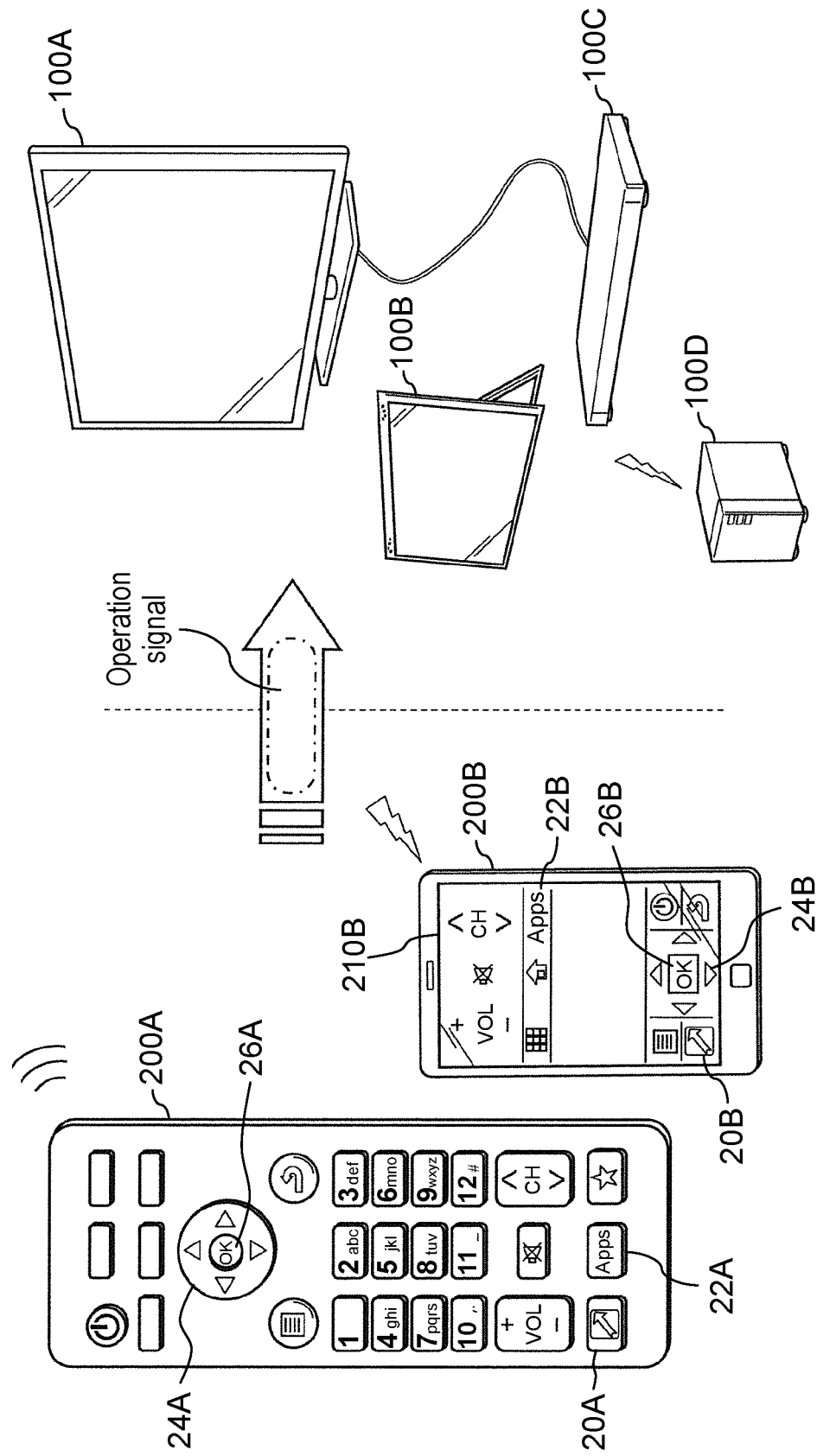
FIG. 1 is a view schematically illustrating one example of an external appearance of a video output apparatus according to a first exemplary embodiment and one example of an external appearance of a controller for the video output apparatus.

FIG. 1 is a view schematically illustrating one example of external appearances of video output apparatuses 100A to 100D and external appearances of controllers for video output apparatuses 100A to 100D according to the first exemplary embodiment.

Each of video output apparatuses 100A to 100D illustrated in the right part of FIG. 1 is an example of the video output apparatus in the present exemplary embodiment. Note that, when video output apparatuses 100A to 100D are described without distinction, video output apparatuses 100A to 100D are collectively referred to as "video output apparatus 100" below.

Video output apparatus 100 according to the present exemplary embodiment outputs a video to be provided to a user.

In the present disclosure, the expression of "video output apparatus 100 outputs a video" and its similar expression are used as expressions expressing that a video, an image or a picture is displayed with a display device such as a display unit included in video output apparatus 100 and that a video signal, an image signal or a picture signal which can be displayed with an external device (for example, television receiver, monitor, or projector) installed at the outside of video output apparatus 100 is transmitted to such an external device from video output apparatus 100.

In the present exemplary embodiment, video output apparatus 100A is shown as an example of a television receiver (for example, a big-screen television receiver) placed and used mainly at home, for example. Further, video output apparatus 100B is shown as an example of a television receiver which is portable (for example, a portable television receiver). Each of video output apparatus 100A and video output apparatus 100B is provided with a display device and displays an image in the display device to execute various functions. Examples of such functions include a function for providing, to a user, various settings such as display setting for an image based on a video signal from a broadcast station or a video player, setting of a broadcast station to be received, setting of connection and coordination with other devices, timer setting, image quality setting, sound quality setting, power-saving mode setting, or displaying a data list. When video output apparatus 100 is connectable to the Internet (for example, smart television), the above-mentioned functions may be provided to the user when application programs (hereinafter also referred to as "application") installed in video output apparatus 100 are operated. Examples of such applications include applications enabling various online services such as video sharing, video distribution, game, or shopping, and applications enabling, for example, browsing of web pages. Note that these applications are merely examples. The above-mentioned applications are not limited to applications that require connection of video output apparatus 100 to the Internet.

In the present exemplary embodiment, video output apparatus 100C is shown as an example of a video player or a video recorder, and video output apparatus 100D is shown as an example of a media server. Video output apparatus 100C and video output apparatus 100D may not be provided with a display device, or may be provided with a relatively small display device that can only display a relatively small amount of information. Video output apparatus 100C and video output apparatus 100D transmit a video signal of a video to be viewed by the user to an apparatus provided with a display device (for example, video output apparatus 100A or video output apparatus 100B) in a wired or wireless manner. Video output apparatus 100C and video output apparatus 100D also transmit a video signal of a video to be presented to the user for providing various functions to the user to an apparatus provided with a display device (for example, video output apparatus 100A or video output apparatus 100B). Examples of such functions include a function for providing detailed information of the own apparatus to the user, a function for providing various settings to the user, and a function to be provided to the user when the applications described above run.

Note that, in the present exemplary embodiment, video output apparatus 100 is not limited to the apparatuses described above. Video output apparatus 100 may be a computer of various types, such as a desk top computer, notebook-type computer (lap-top computer), or tablet type computer, or may be a smartphone, a game machine, or a set top box, for example.

Each of remote controller 200A and remote controller 200B shown in the left part in FIG. 1 is an example of an operation device for video output apparatus 100 in the present exemplary embodiment. It is to be noted that, when remote controller 200A and remote controller 200B are described without distinction, remote controller 200A and remote controller 200B are collectively referred to as "remote controller 200" below.

The operation device for video output apparatus 100 in the present exemplary embodiment outputs an operation signal indicating a code according to an operation performed by the user. The code indicated by the operation signal is different depending on an operation performed on the operation device by the user. For example, when the operation device is a remote controller provided with a plurality of keys as operation parts as illustrated in FIG. 1, a code indicated by an operation signal output from the operation device is different depending on a key pressed by the user. Hereinbelow, the code indicated by the operation signal is also referred to as a "key code".

The operation signal output from remote controller 200 in response to the depression of any one of the keys by the user as described above is received by video output apparatus 100. A later-described storage included in video output apparatus 100 stores codes (key codes) indicated by operation signals and functions corresponding to the codes in association with each other. When video output apparatus 100 executes a program (for example, application) that achieves the function associated with the code (key code) indicated by the operation signal which is received from remote controller 200, the function corresponding to the key pressed by the user is provided to the user.

Remote controller 200A is, for example, a remote controller for a television receiver and provided with a plurality of keys (which can be mechanistically pressed). Remote controller 200B is, for example, a smartphone or a tablet type computer installed with an application for enabling remote controller 200B to function as a remote controller for a television receiver. When such an application runs, an on-screen key is displayed in display device 210B of remote controller 200B as illustrated in FIG. 1. A rectangular region provided at the center of display device 210B of remote controller 200B illustrated in FIG. 1 may be a trackpad.

Note that display device 210B of remote controller 200B is a touch panel, and the user cannot mechanistically press a key or icon displayed in display device 210B. However, in the present disclosure, a user's operation for touching and selecting a key or icon displayed in the touch panel is also expressed as "pressing" a key or icon.

As described above, remote controller 200 may be a device manufactured only for use as a remote controller such as remote controller 200A, or may be a device, such as remote controller 200B, which can execute a plurality of programs or applications and which functions as a remote controller when any one of the programs or applications is executed. Further, remote controller 200 may be usable only for one type of video output apparatus 100, or may be usable for various types of video output apparatuses 100 (for example, usable for both video output apparatus 100A and video output apparatus 100C, or for television receivers manufactured by different manufacturers).

The operation signal from remote controller 200 illustrated in FIG. 1 is output as a wireless signal. To output the wireless signal, infrared rays may be used or radio waves may be used, for example. In addition, a communication method complying with various wireless communication standards such as Infrared Data Association (IrDA), Bluetooth (registered trademark), ZigBee (registered trademark), or Wi-Fi (registered trademark) may be used.

Remote controller 200 has a definition key to which a function can be allocated by the user. For example, remote controller 200A has definition key 20A. Remote controller 200B has definition key 20B. In the example shown in FIG. 1, definition key 20A and definition key 20B are both indicated by an icon including a right up arrow. It is to be noted that, when definition key 20A and definition key 20B are described without distinction, definition key 20A and definition key 20B are collectively referred to as "definition key 20" below.

Video output apparatus 100 can allocate, to definition key 20, a function called by an operation of sequentially depressing a plurality of keys of remote controller 200 (this operation is also referred to as a "multi-step key operation"). When such a function is allocated to definition key 20, the user can subsequently call the function, which is previously called by the multi-step key operation, by pressing definition key 20 only once.

For example, it is supposed that, in an initial state of video output apparatus 100, the plurality of applications described above includes an application which achieves a user's desired function by a key operation including three steps described below.

1. The user presses an "Apps" key (key 22A, key 22B shown in FIG. 1) to display an image of an application list on the display device of video output apparatus 100.

2. The user selects a desired application using an arrow key (key 24A, key 24B shown in FIG. 1) or the trackpad area provided in the center of display device 210B.

3. The user presses an "OK" key (key 26A, key 26B shown in FIG. 1).

When the startup of an application which requires the multi-step key operation as described above is allocated to definition key 20, the user can start up this application by pressing definition key 20 only once (that is, only by a one-step operation). The allocation of the function of the application to definition key 20 is achieved in such a way that information indicating that the application is associated with a code (key code) indicated by an operation signal output from remote controller 200 in response to the depression of definition key 20 is stored in storage 130 in video output apparatus 100.

In this way, definition key 20 to which a function can be allocated reduces a burden on a user for a key operation and enables the user to quickly use the desired function, when the user uses a function which requires a multi-step key operation in an initial state of video output apparatus 100.

A definition key to which a function can be simply allocated is well known as a conventional feature, as disclosed in PTL 1. However, with the conventional definition key, it may be hard for a user to allocate a function to the definition key while the user is not accustomed to using, for example, a video output apparatus or a remote controller for the video output apparatus.

Further, when settings of the video output apparatus are initialized for some reason after a function is allocated to the definition key, information indicating an association between the code (key code) of the definition key and the function associated with the code (key code) (or a program for executing the function) is lost from the video output apparatus. Therefore, even when the user presses the definition key, the video output apparatus does not execute the function. In this case, it may be difficult for the user to recognize the initialization of the setting of the definition key. The user needs to allocate the function again to the definition key. However, if the user is unaccustomed to using the remote controller, the user may have difficulty performing such an operation.

The detail of video output apparatus 100 in the present exemplary embodiment will now be described. According to the present exemplary embodiment, the inconvenience which would be caused by the conventional definition key can be reduced, and convenience of the definition key can be improved.

In the present exemplary embodiment, definition key 20 is an example of a definition operation part to which a function of video output apparatus 100 can be allocated by a user. The definition operation part in the present exemplary embodiment is not limited to definition key 20 included in remote controller 200. For example, with video output apparatus 100B having a display device smaller than the display device of video output apparatus 100A, the user may perform an operation with the operation part included in video output apparatus 100B. In video output apparatus 100B described above, the definition operation part may be achieved as definition key 20 included in video output apparatus 100B or as an operation part, such as a switch, corresponding to definition key 20. Further, the operation device and the definition operation part may be implemented as a hardware provided to a housing of video output apparatus 100B, or may be implemented as a key or icon displayed in the display device of video output apparatus 100B when software is executed. In addition, the definition operation part may be provided to video output apparatus 100A, video output apparatus 100C, or video output apparatus 100D. Regarding video output apparatus 100C and video output apparatus 100D, the definition operation part may be implemented as a key or icon displayed in a display device of an external device when software is executed in video output apparatus 100C or video output apparatus 100D.

[1-2. Configuration and Operation]

Figure 2A:
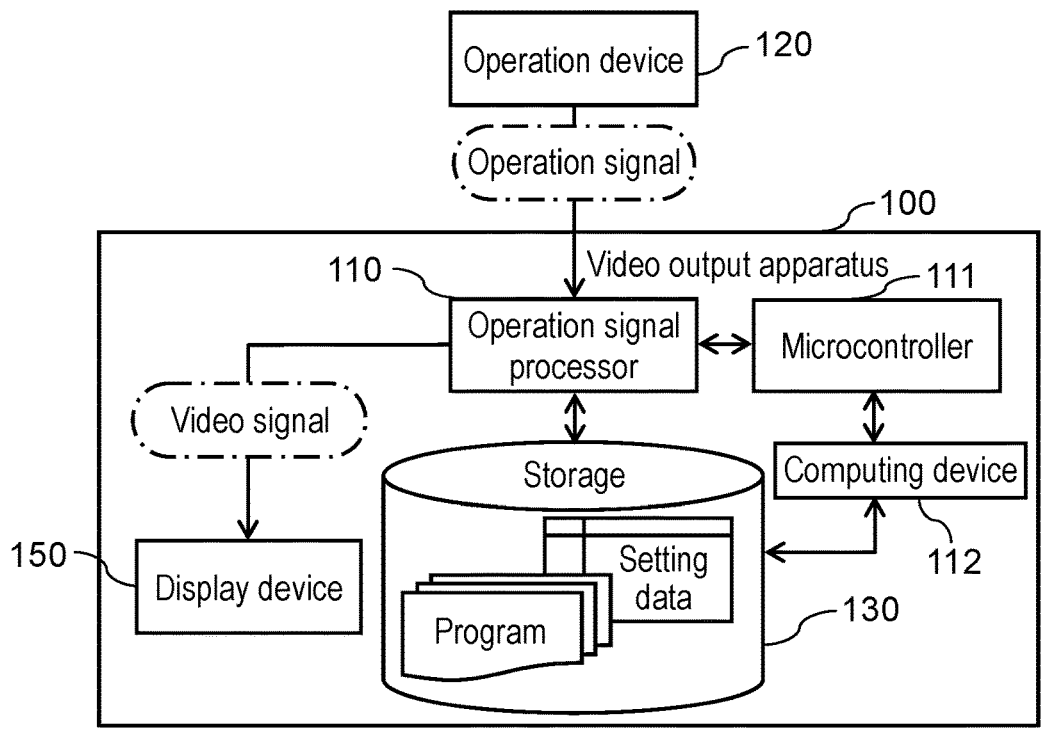
FIG. 2A is a block diagram schematically illustrating one example of a configuration of the video output apparatus according to the first exemplary embodiment.

FIG. 2A is a block diagram schematically illustrating one example of the configuration of video output apparatus 100 according to the first exemplary embodiment.

As illustrated in FIG. 2A, video output apparatus 100 includes operation signal processor 110, storage 130, and display device 150. Video output apparatus 100 also includes operation device 120 used by the user to operate video output apparatus 100 at the outside of video output apparatus 100. Operation device 120 transmits, to video output apparatus 100, an operation signal corresponding to an operation performed by the user on operation device 120. Then, video output apparatus 100 displays a video based on the operation signal received from operation device 120 in display device 150. Operation device 120 illustrated in FIG. 2A is remote controller 200 described with reference to FIG. 1, for example.

Note that video output apparatus 100 shown in FIG. 2A may be video output apparatus 100A or video output apparatus 100B operated using remote controller 200, or may be video output apparatus 100C or video output apparatus 100D.

When the user operates operation device 120, an operation signal indicating a code (key code) according to the operation is output from operation device 120 with infrared rays or radio waves, for example. Video output apparatus 100 is provided with a receiver (not illustrated) that can receive infrared rays or radio waves output from operation device 120 and extract the operation signal. Thus, video output apparatus 100 receives the operation signal via the receiver.

Operation signal processor 110 executes a later-described predetermined process, when receiving the operation signal. Depending on the result of the process, a video signal indicating a video to be provided to the user is transmitted to later-described display device 150 from operation signal processor 110.

Operation signal processor 110 instructs microcontroller 111 included in video output apparatus 100 to execute a program which is stored in storage 130 and which specifies a process upon receipt of the operation signal. Due to control of microcontroller 111 receiving the instruction, computing device 112 included in video output apparatus 100 executes the program. In this way, the process according to the program is achieved.

Storage 130 stores programs for achieving various functions of video output apparatus 100A. In the present disclosure, the programs include various applications described above. Further, a plurality of functions may be achieved by a single program, and each function may be achieved by a module configuring the program. In the present disclosure, anything that provides functions to the user when executed by computing device 112 is expressed as a "program" for convenience sake, regardless of whether it is a program or a module which is a part of the program.

Storage 130 also stores information indicating an association between the code (key code) indicated by the operation signal received from operation device 120 and functions of video output apparatus 100. For example, the information indicating the association may be tabular setting data indicating the association between codes (key codes) and programs for achieving functions, and this setting data may be stored in storage 130.

FIG. 3 is a schematic diagram for describing one example of a configuration of the setting data stored in storage 130 of video output apparatus 100 in the first exemplary embodiment. FIG. 3 shows an initial state of the setting data.

The setting data is tabular data with multiple rows and two columns. The left column of the setting data shown in FIG. 3 includes codes (key codes) indicated by operation signals received from operation device 120. These codes (key codes) do not overlap in the setting data. The right column shown in FIG. 3 includes information indicating programs for achieving functions of video output apparatus 100. In the setting data stored in storage 130, a code (key code) and information indicating a program are written side by side in each row, for example, to provide an association between the code (key code) and the program corresponding to the code (key code). In the example shown in FIG. 3, the name or outline of the function achieved by each program is conveniently shown as information indicating programs. However, information indicating programs is not limited to the example shown in FIG. 3. In the setting data, examples of information indicating programs include a file name of a program which is started to provide each function to the user, a location where the program is stored, or a command for calling a program which achieves each function.

Note that storage 130 may have an area where the data or program read by computing device 112 is temporarily stored.

Storage 130 may be achieved by a memory included in microcontroller 111 of video output apparatus 100, a storage device such as a hard disk drive or a semiconductor memory included in video output apparatus 100, or a combination of such components, for example. Storage 130 may have a rewritable area. The above-mentioned setting data may be written in the rewritable area.

Display device 150 displays a video based on the input video signal on a video display surface. Display device 150 is, for example, a liquid crystal display, an organic electroluminescence (EL) display, a plasma display, or a cathode ray tube (CRT) display. Display device 150 may be a video projector using, for example, liquid crystal or a digital micromirror device (DMD).

Figure 2B:
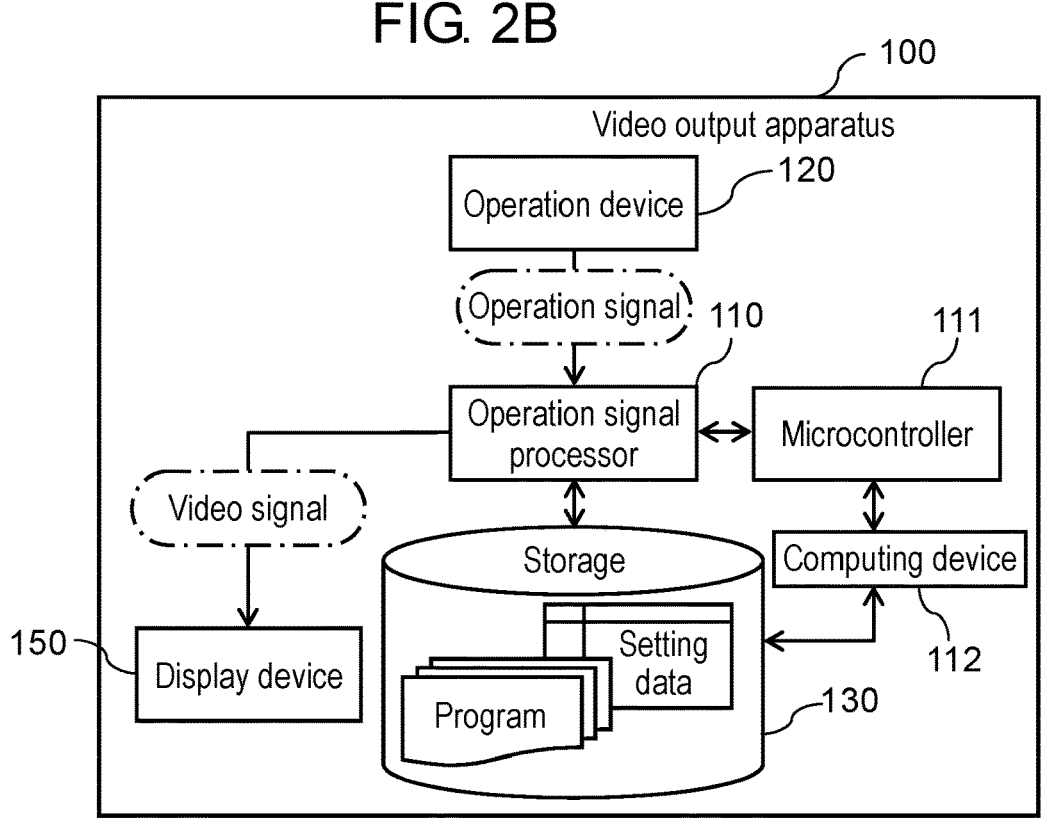
FIG. 2B is a block diagram schematically illustrating another example of the configuration of the video output apparatus according to the first exemplary embodiment.
Figure 2C:
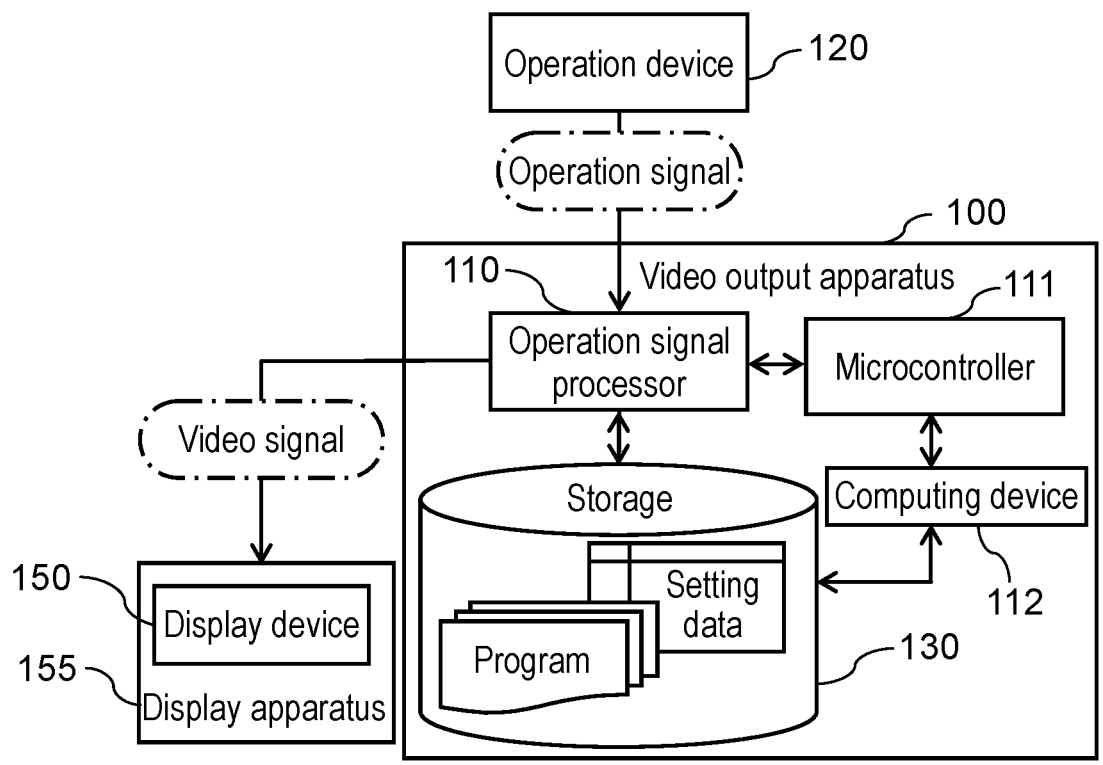
FIG. 2C is a block diagram schematically illustrating still another example of the configuration of the video output apparatus according to the first exemplary embodiment.

FIG. 2B is a block diagram schematically illustrating another example of the configuration of video output apparatus 100 according to the first exemplary embodiment. FIG. 2C is a block diagram schematically illustrating still another example of the configuration of video output apparatus 100 according to the first exemplary embodiment. FIGS. 2B and 2C illustrate an example of video output apparatus 100 having a configuration different from the configuration of video output apparatus 100 illustrated in FIG. 2A.

Specifically, video output apparatus 100 illustrated in FIG. 2B includes operation device 120 as components, and this configuration is different from video output apparatus 100 illustrated in FIG. 2A having operation device 120 at the outside. Video output apparatus 100 illustrated in FIG. 2B may be video output apparatus 100A or video output apparatus 100B, illustrated in FIG. 1, which includes an operation part such as a key or switch serving as operation device 120.

Video output apparatus 100 illustrated in FIG. 2C has a configuration in which display device 150 is not included in video output apparatus 100 but included in display apparatus 155 which is an external device of video output apparatus 100, and this configuration is different from video output apparatus 100 including display device 150 illustrated in FIG. 2A. In video output apparatus 100 illustrated in FIG. 2C, a video signal output from operation signal processor 110 is output to display apparatus 155 having display device 150. Video output apparatus 100 illustrated in FIG. 2C may be video output apparatus 100C or video output apparatus 100D, illustrated in FIG. 1, which outputs a video signal to, for example, an external device having a display device, such as a television receiver.

In video output apparatus 100 illustrated in FIGS. 2B and 2C, components denoted by the same reference marks as the components of video output apparatus 100 illustrated in FIG. 2A are considered to perform substantially the same operations as the corresponding components, and thus, duplicate descriptions will be omitted. Further, although different in configuration, video output apparatuses 100 illustrated in FIGS. 2A to 2C are substantially the same regarding the operation which is intended to be achieved by the present disclosure, and therefore, duplicate descriptions will be omitted.

As described above, the present exemplary embodiment provides a plurality of configurations applicable to video output apparatus 100. The configuration of video output apparatus 100 is not limited to the configuration examples described above. For example, video output apparatus 100 may be configured to include operation device 120 without having display device 150. Video output apparatus 100 may only have operation signal processor 110 and storage 130. Note that microcontroller 111 and computing device 112 may be included in operation signal processor 110. Alternatively, at least a portion of microcontroller 111 may function as operation signal processor 110. Alternatively, computing device 112 may be included in microcontroller 111. Video output apparatus 100 may include at least one or neither of operation device 120 and display device 150. Alternatively, video output apparatus 100 may be configured such that at least one of operation device 120 and display device 150 is not provided inside but provided to an external device of video output apparatus 100. In addition, video output apparatus 100 may include operation devices 120 both inside and outside of video output apparatus 100.

Next, a predetermined process executed by operation signal processor 110 receiving an input of an operation signal in video output apparatus 100 will be described.

Figure 4:
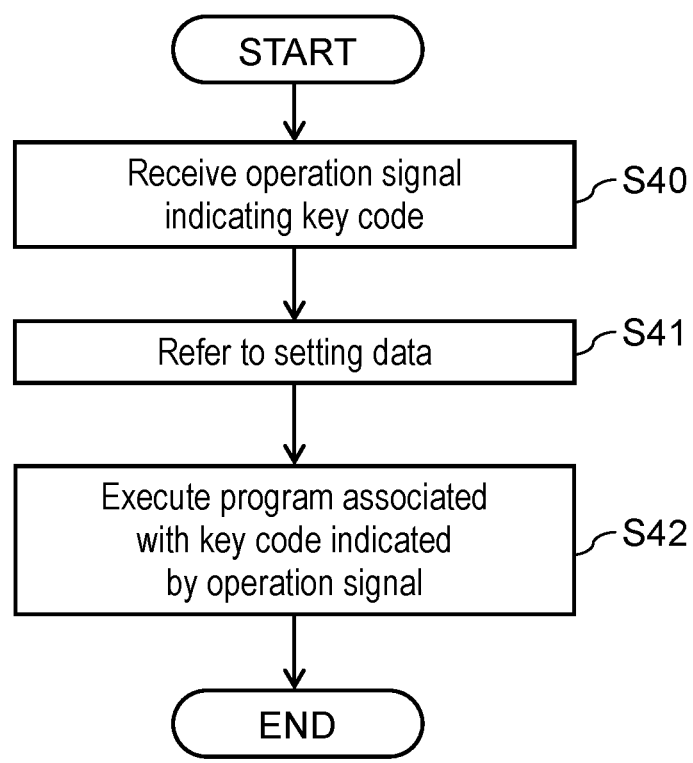
FIG. 4 is a flowchart illustrating an example of operation of the video output apparatus according to the first exemplary embodiment.

FIG. 4 is a flowchart illustrating an operation example of video output apparatus 100 according to the first exemplary embodiment. FIG. 4 illustrates the flowchart for describing the predetermined process.

Operation signal processor 110 receives an operation signal output from operation device 120 and indicating a code (key code) (step S40).

Operation signal processor 110 receiving the operation signal accesses to storage 130 to refer to the setting data illustrated in FIG. 3 as one example (step S41).

Operation signal processor 110 acquires, from the setting data, the program associated with the code (key code) indicated by the received operation signal. For example, operation signal processor 110 refers to the setting data illustrated in FIG. 3 as one example, and acquires information (information indicating the program) included in the row corresponding to the code (key code) indicated by the received operation signal in the setting data. Then, operation signal processor 110 reads the program indicated by the information from storage 130, and executes this program (step S42).

It is to be noted that operation signal processor 110 may be configured to execute the program by oneself, or to instruct microcontroller 111 to execute this program.

When operation signal processor 110 executes the above-mentioned process, video output apparatus 100 executes a function according to the operation performed on operation device 120 by the user.

In the present exemplary embodiment, when video output apparatus 100 is in an initial state, the code (key code) of definition key 20 and a program for achieving the function of "function allocation setting" are associated with each other in the setting data.

The "function allocation setting" is a function for displaying a predetermined operation image (see FIGS. 5A and 5B) in display device 150 to provide, to the user, settings for allocating a function to definition key 20. In other words, the "function allocation setting" is a function for displaying, in display device 150, an operation image (predetermined operation image) used for selecting a function the user intends to cause video output apparatus 100 to execute when pressing definition key 20.

The program (hereinafter also referred to as "function allocation setting program") for achieving the function of the "function allocation setting" is one of the plurality of programs stored in storage 130, and this program enables display of a predetermined operation image in display device 150. In the present exemplary embodiment, an operation image (for example, the operation image shown in FIGS. 5A and 5B) that provides, to the user, settings for allocating one of the plurality of functions of video output apparatus 100 to definition key 20 is referred to as a predetermined operation image.

When executing the function allocation setting program, operation signal processor 110 outputs a video signal indicating the predetermined operation image to display device 150 to display the predetermined operation image in display device 150. Operation signal processor 110 then rewrites the setting data stored in storage 130 according to an operation (that is, operation for allocating a function desired by the user to definition key 20) performed by the user on the operation image. Specifically, operation signal processor 110 rewrites the setting data stored in storage 130 to associate the information indicating the program that achieves the function allocated by the user to definition key 20 with the code (key code) of definition key 20.

In the present exemplary embodiment, when video output apparatus 100 is in the initial state, the function allocation setting program is associated with the code (key code) of definition key 20. Hereinafter, this association in the initial state is also referred to as an "initial association".

The setting data stored in video output apparatus 100 in the initial state will be described with reference to FIG. 3. The setting data illustrated in FIG. 3 is one example of the setting data in the initial state. In the setting data shown in FIG. 3, a character string of "02 20 80 0f ce" written in the key-code field of data row R10 is one example of a definition operation part code which is a code (key code) output from operation device 120 when definition key 20 is pressed. In the setting data in the initial state, the "function/program" field of data row R10 includes "function allocation setting". Therefore, when receiving an operation signal indicating a code (key code) (that is, the definition operation part code) corresponding to the operation performed on definition key 20 in the initial state of video output apparatus 100, operation signal processor 110 executes the function allocation setting program that achieves the function of the "function allocation setting" based on the initial association.

It is to be noted that operation signal processor 110 may be configured to execute the function allocation program by oneself, or to instruct microcontroller 111 to execute the function allocation setting program.

Figure 5A:
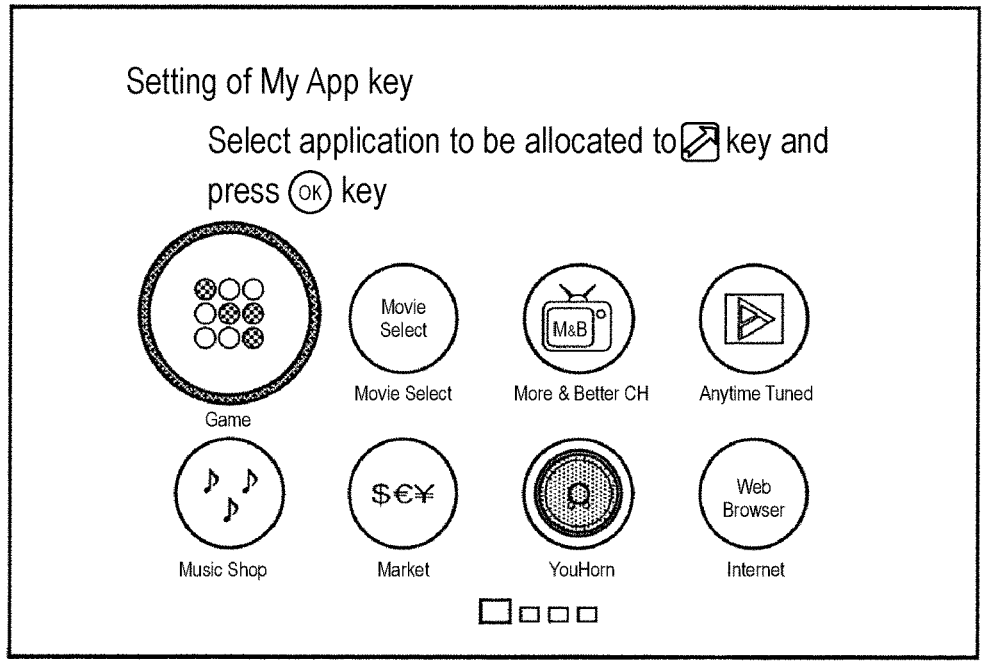
FIG. 5A is a view illustrating one example of an operation image that provides, to a user, settings for allocating one of functions of the video output apparatus to a definition key in the first exemplary embodiment.
Figure 5B:
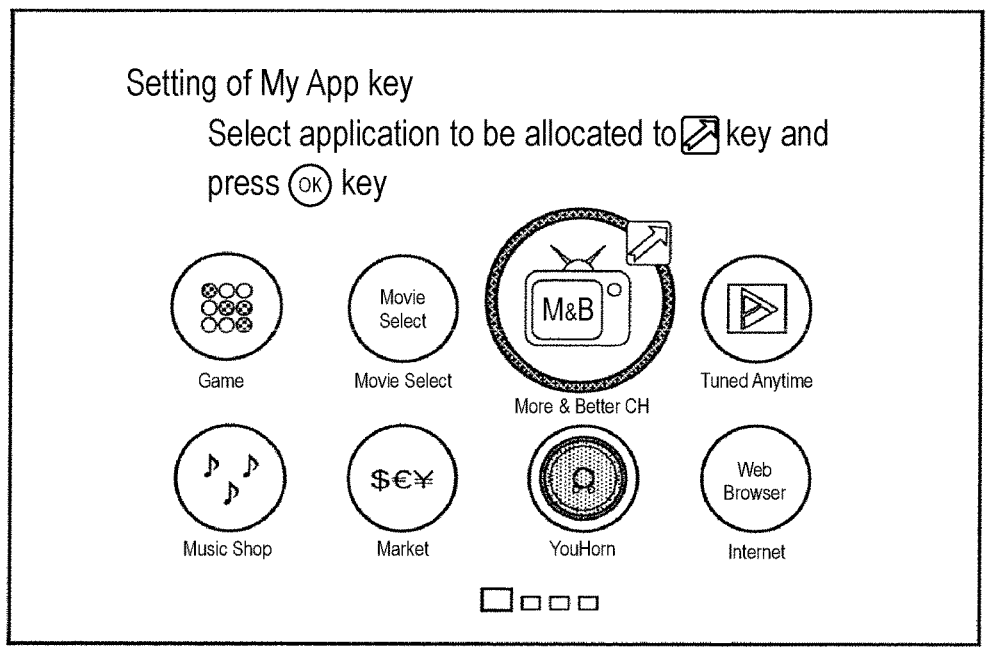
FIG. 5B is a view illustrating one example of an operation image that provides, to a user, settings for allocating one of functions of the video output apparatus to the definition key in the first exemplary embodiment.

FIGS. 5A and 5B are views illustrating one example of the operation image for providing, to the user, settings for allocating one of the functions of video output apparatus 100 to definition key 20 in the first exemplary embodiment.

FIG. 5A illustrates one example of the operation image displayed in display device 150 when definition key 20 is pressed in the initial state of video output apparatus 100. For example, when the user presses definition key 20 for the first time after purchase of video output apparatus 100, the operation image illustrated in FIG. 5A is displayed in display device 150. A "My App key" illustrated in the example of the operation image is one example of a name of definition key 20. Various applications are shown in the operation image illustrated in FIG. 5A as a list of functions which can be allocated to definition key 20, and applications are examples of functions which can be allocated to definition key 20. In the present disclosure, functions which can be allocated to definition key 20 are not limited to functions which can be achieved by applications. For example, video output apparatus 100 may be configured such that a function achieved by a module of an operation system of video output apparatus 100 is allocated to definition key 20.

In FIG. 5A, eight circular icons displayed in two rows in the operation image show different applications. In the example in the present exemplary embodiment, an icon selected by the user is displayed larger than other icons with a border darker than the borders of other icons, whereby the icon selected by the user is visually distinguished from other icons. For example, in the example shown in FIG. 5A, from among eight icons in the operation image, the icon of "Game" application located on the upper left corner is displayed larger than other icons with a border darker than borders of other icons. This indicates that the icon of the "Game" application is selected by the user.

The operation image illustrated in FIG. 5A is one example of an image provided to the user when the user allocates a function to definition key 20. The icons displayed in the operation image are not limited to have a circular shape, and may have other shapes. The number of icons displayed in the operation image is not limited to eight. The icons displayed in the operation image are not limited to indicate applications, and may indicate other functions. In the example illustrated in FIG. 5A, an icon selected by the user is displayed larger than other icons with a border darker than the borders of other icons. This configuration is one example for visually distinguishing the icon selected by the user from other icons, and the present exemplary embodiment is not limited to the example illustrated in FIG. 5A. In the present exemplary embodiment, the icon selected by the user only requires to be visually distinguished from other icons. For example, only the icon selected by the user may be given an animation effect (for example, periodic change of brightness or chromaticity, periodic change of shape, periodic change of position, periodic change of size, vibration, or a combination of such effects) so as to be visually distinguishable from other icons.

The user can select an icon of a desired application with key 24A (arrow key) of remote controller 200A or the trackpad area (see FIG. 1) of remote controller 200B, for example.

It is to be noted that FIG. 5A shows the operation image before any function is allocated to definition key 20. In the example shown in FIG. 5A, the "Game" application icon is selected by the user, but the "Game" application is not yet allocated to definition key 20. Therefore, when the operation image illustrated in FIG. 5A is displayed in display device 150, the function allocated to definition key 20 is the function allocation setting program.

For example, the user presses key 26A (OK key) of remote controller 200A or key 26B (OK key) of remote controller 200B (see FIG. 1) while selecting the icon of the desired application in the operation image. With this process, the user can allocate the desired function to definition key 20. For example, when the user presses key 26A (OK key) or key 26B (OK key) while selecting a "More Better CH" application icon which is the second icon from the right on the upper row in the operation image illustrated in FIG. 5A, the operation image turns into the state illustrated in FIG. 5B from the state illustrated in FIG. 5A. With this operation, the function allocated to definition key 20 is changed from the function by the function allocation setting program to the function achieved by the application indicated by this icon. In this case, in the example in the present exemplary embodiment, an arrow icon is superimposed on the icon indicating the application allocated to definition key 20. This visually shows that this application is allocated to definition key 20. Thus, the user can easily recognize the application (function) allocated to definition key 20.

In this case, the setting data is changed to the state illustrated in FIG. 6 from the initial state illustrated in FIG. 3 according to the function allocation setting program. Specifically, in the setting data, the information associated with the code (key code) of definition key 20 shown in data row R10 is changed to the information indicating the "More Better CH" application from the information indicating the function allocation setting program which is set in the initial state. After such a change is executed, the "More Better CH" application is started in video output apparatus 100 in response to the depression of definition key 20 by the user until the setting data is newly changed.

In the example of the operation image illustrated in FIG. 5B, the arrow icon superimposed on the upper right corner of the "More Better CH" application is an example of graphics visually showing the user that the function achieved by the application is allocated to the "My App key" which is definition key 20. However, the present exemplary embodiment is not limited to the example illustrated in FIG. 5B. In the present exemplary embodiment, it is only necessary that the icon (function) allocated to definition key 20 is displayed to be visually distinguishable from other icons or from an icon (for example, the "Game" application icon illustrated in FIG. 5A) which is only selected by the user without being allocated to definition key 20. For example, the icon allocated to definition key 20 may be given an animation effect (for example, periodic change of brightness or chromaticity, periodic change of shape, periodic change of position, periodic change of size, vibration, or a combination of such effects) so as to be visually distinguishable from other icons or an icon only selected by the user. In the initial state, the function allocation setting program is allocated to definition key 20 in the setting data, and this information may be provided to the user or may not be provided to the user. For convenience sake, information showing the user that no application (function) is allocated to definition key 20 may be displayed in the operation image in the initial state.

As described above, in the present exemplary embodiment, in video output apparatus 100 in an initial state, the function allocation setting program is associated with the code (key code) corresponding to definition key 20. Thus, when the user using video output apparatus 100 in the initial state presses definition key 20 of operation device 120 (for example, when the user presses definition key 20 of operation device 120 for the first time after purchase of video output apparatus 100), the function allocation setting program is started in video output apparatus 100. Therefore, an operation image for setting definition key 20 (that is, for allocating any function to definition key 20) is displayed on video output apparatus 100. In this way, the user using video output apparatus 100 described in the present exemplary embodiment can display the operation image for allocating any function to definition key 20 on video output apparatus 100 only by pressing definition key 20, whether the user is accustomed to using video output apparatus 100 or not. As a result, a user who is not accustomed to using video output apparatus 100 can also easily allocate any function to definition key 20.

Further, when settings of video output apparatus 100 are initialized, the setting data is returned to the initial state described above. Therefore, after the settings of video output apparatus 100 are initialized, the operation image based on the function allocation setting program is displayed on video output apparatus 100 in response to the depression of definition key 20 by the user. Specifically, in video output apparatus 100 in which the settings are initialized, the function allocation setting program is started when definition key 20 is pressed, as in video output apparatus 100 in the initial state. Thus, the user using video output apparatus 100 in which settings are initialized can easily allocate again the function, which has been previously allocated to definition key 20, to definition key 20 without performing complex operation. As described above, video output apparatus 100 in the present exemplary embodiment can improve convenience for the user.

[1-3. Modification]

In video output apparatus 100, when definition key 20 is pressed with no function being allocated to definition key 20, the operation image based on the function allocation setting program may be displayed in display device 150 according to an operation which is partly different from the above-mentioned operation.

For example, the initial association may not be performed on the setting data. For example, the code (key code) corresponding to definition key 20 and the function allocation setting program may be associated with each other in a program that is to be executed by video output apparatus 100 and that specifies a process upon receipt of an operation signal. For example, the program may specify that, when information of a program (for example, application) associated with the code (key code) corresponding to definition key 20 is not included in the setting data, the function allocation setting program is executed. Video output apparatus 100 may perform an initial association as described above.

For example, in the initial state, no function may be associated with the code (key code) corresponding to definition key 20 written in data row R10 (see FIG. 3) in the setting data stored in storage 130 (for example, NULL may be stored in the "function/program" field of data row R10). In such a case, operation signal processor 110 receiving the operation signal indicating the code (key code) corresponding to definition key 20 may execute the function allocation setting program (or may instruct microcontroller 111 to execute the function allocation setting program) in accordance with the above-mentioned program that specifies the process upon receipt of the operation signal.

Note that, in the setting data, only information which associates the code (key code) corresponding to definition key 20 and a program (application) selected by the user with each other may be stored. Then, a code (key code) according to an operation on the operation part of operation device 120 and a program (application) may be associated with each other in the program that specifies the process, upon receipt of the operation signal, which is executed by operation signal processor 110 (or which is executed by microcontroller 111 according to an instruction from operation signal processor 110).

[1-4. Effects]

As described above, the video output apparatus in the present exemplary embodiment includes: an operation device that outputs an operation signal indicating a code according to an operation; an operation signal processor that executes a process according to the code upon receipt of the operation signal; and a storage that stores a plurality of programs for achieving a plurality of functions, and an association between the code and any of the plurality of programs, wherein the operation device has a definition operation part to which a function achieved by any of the plurality of programs is allocatable, the plurality of programs includes a function allocation setting program for outputting an operation image for allocating the function to the definition operation part, the storage stores, as an initial association, an association between a definition operation part code which is a code according to an operation on the definition operation part and the function allocation setting program, and the operation signal processor executes the function allocation setting program based on the initial association and outputs the operation image, upon receipt of the operation signal indicating the definition operation part code output from the operation device.

Further, a video output method in the present exemplary embodiment is a method for outputting an image of an operation image, the method being executed by a video output apparatus including: an operation device that outputs an operation signal indicating a code according to an operation and has a definition operation part to which a function achieved by any of a plurality of programs is allocatable; an operation signal processor that executes a process according to the code upon receipt of the operation signal; and a storage that stores a plurality of programs including a function allocation setting program for outputting an operation image for allocating the function to the definition operation part, and an association between the code and any of the plurality of programs, wherein the storage stores, as an initial association, an association between a definition operation part code which is a code according to an operation on the definition operation part and the function allocation setting program, and the operation signal processor executes the function allocation setting program based on the initial association and outputs the operation image, upon receipt of the operation signal indicating the definition operation part code output from the operation device.

Note that video output apparatus 100 (or video output apparatus 100A, 100B, 100C, or 100D) is an example of the video output apparatus. Operation device 120 (or remote controller 200A or remote controller 200B) is an example of the operation device. Operation signal processor 110 is an example of the operation signal processor. Storage 130 is an example of the storage. The setting data illustrated in FIG. 3 or 6 is an example of the association. Definition key 20 is an example of the definition operation part. The operation image illustrated in FIG. 5A or 5B is an example of the operation image for allocating the function to the definition operation part. The program for achieving the function of the "function allocation setting" described in the first exemplary embodiment is an example of the function allocation setting program. The setting data illustrated in FIG. 3 is an example of the initial association. The character string of "02 20 80 0f ce" illustrated in FIG. 3 is an example of the definition operation part code.

For example, in the example in the first exemplary embodiment, video output apparatus 100 includes operation device 120 (for example, remote controller 200) that outputs an operation signal indicating a code (key code) corresponding to an operation, operation signal processor 110, and storage 130. Operation signal processor 110 executes a process according to the code (key code) indicated by the operation signal output from operation device 120 upon receipt of the operation signal. Storage 130 stores a plurality of programs for achieving a plurality of functions executable with video output apparatus 100, and information indicating an association between the code (key code) indicated by the operation signal and any of the plurality of programs. Operation device 120 has definition key 20 to which a function achieved by any of the plurality of programs can be allocated. The plurality of programs includes the function allocation setting program for outputting an operation image for allocating the function to definition key 20. Storage 130 stores, as an initial association, an association between a definition operation part code which is a code (key code) according to an operation on definition key 20 and the function allocation setting program. Operation signal processor 110 executes the function allocation setting program based on the initial association and outputs the operation image, upon receipt of the operation signal indicating the definition operation part code output from operation device 120.

In video output apparatus 100 configured as described above, the operation image due to the function allocation setting program is displayed in display device 150 of video output apparatus 100 in the initial state only by depression of definition key 20 of remote controller 200 by the user. Therefore, a user who is not accustomed to using video output apparatus 100 can display the operation image in display device 150 only by pressing definition key 20. Thus, a user who is not accustomed to using video output apparatus 100 can easily allocate a desired function of video output apparatus 100 to definition key 20 of remote controller 200.

This effect is obtained when video output apparatus 100 provided with display device 150 displays the operation image in display device 150. This effect is also obtained when video output apparatus 100 displays the operation image in display device 150 provided to external display apparatus 155.

The video output apparatus may include a display device for displaying a video. The operation image may be displayed in the display device.

Note that display device 150 is an example of the display device.

For example, video output apparatus 100 described in the first exemplary embodiment includes display device 150 for displaying a video, and the operation image due to the function allocation setting program is displayed in display device 150.

In video output apparatus 100 configured as described above, the operation image is displayed in display device 150, whereby convenience for a user is improved.

In the video output apparatus, when a program other than the function allocation setting program is associated with the definition operation part code, the operation signal processor may visually show, in the operation image, that the function achieved by the program associated with the definition operation part code is allocated to the definition operation part.

The operation image illustrated in FIG. 5B is an example of an image visually showing that a function provided by the program associated with the definition operation part code is allocated to the definition operation part.

For example, in video output apparatus 100 described in the first exemplary embodiment, when a program other than the function allocation setting program is associated with the definition operation part code corresponding to definition key 20, operation signal processor 110 displays, in the operation image, an icon as illustrated in FIG. 5B which visually shows that the function provided by the program associated with the definition operation part code is allocated to definition key 20. In the example illustrated in FIG. 5B, operation signal processor 110 superimposes an arrow icon on the icon indicating the application allocated to definition key 20.

In video output apparatus 100 configured as described above, the program (or application) associated with definition key 20 can be visually distinguished from other programs (or applications), whereby convenience for a user is improved.

Second Exemplary Embodiment

A second exemplary embodiment will now be described herein with reference to FIGS. 7A and 7B. Components substantially identical to or operating in substantially the same manner as the components included in video output apparatus 100 described in the first exemplary embodiment are given the same reference marks, and are not described in detail below.

[2-1. Outline]

The first exemplary embodiment shows a configuration example in which, upon receipt of an operation signal indicating a code (key code) according to an operation on definition key 20 after a function is allocated to definition key 20 by a user, the operation signal processor 110 acquires information indicating the program associated with the code (key code) from storage 130, reads the program from storage 130 based on the information, and executes the read program.

However, video output apparatus 100 may be unable to start up programs for some reason. For example, if the user uninstalls a program, video output apparatus 100 cannot start this program. Further, when an operation system of video output apparatus 100 is updated, video output apparatus 100 may not start a program less compatible with the updated operation system. In such a case, if the program is associated with a code (key code) according to an operation on definition key 20, video output apparatus 100 does not execute the function associated with definition key 20 even when definition key 20 is pressed.

In this case, the operation image for allocating a function to definition key 20 as illustrated in FIG. 5A may be displayed on the video output apparatus. The second exemplary embodiment describes a video output apparatus which operates as described above.

[2-2. Configuration and Operation]

The configuration of the video output apparatus in the second exemplary embodiment is substantially the same as the configuration of video output apparatus 100 illustrated in FIGS. 2A to 2C in the first exemplary embodiment. Therefore, video output apparatus 100 is applied as the video output apparatus in the second exemplary embodiment, and description for the configuration will not be repeated. Operation of video output apparatus 100 in the second exemplary embodiment will be described below.

Video output apparatus 100 in the second exemplary embodiment is different from video output apparatus 100 in the first exemplary embodiment in a program that specifies an operation procedure of video output apparatus 100 executed upon receipt of an operation signal.

Figure 7A:
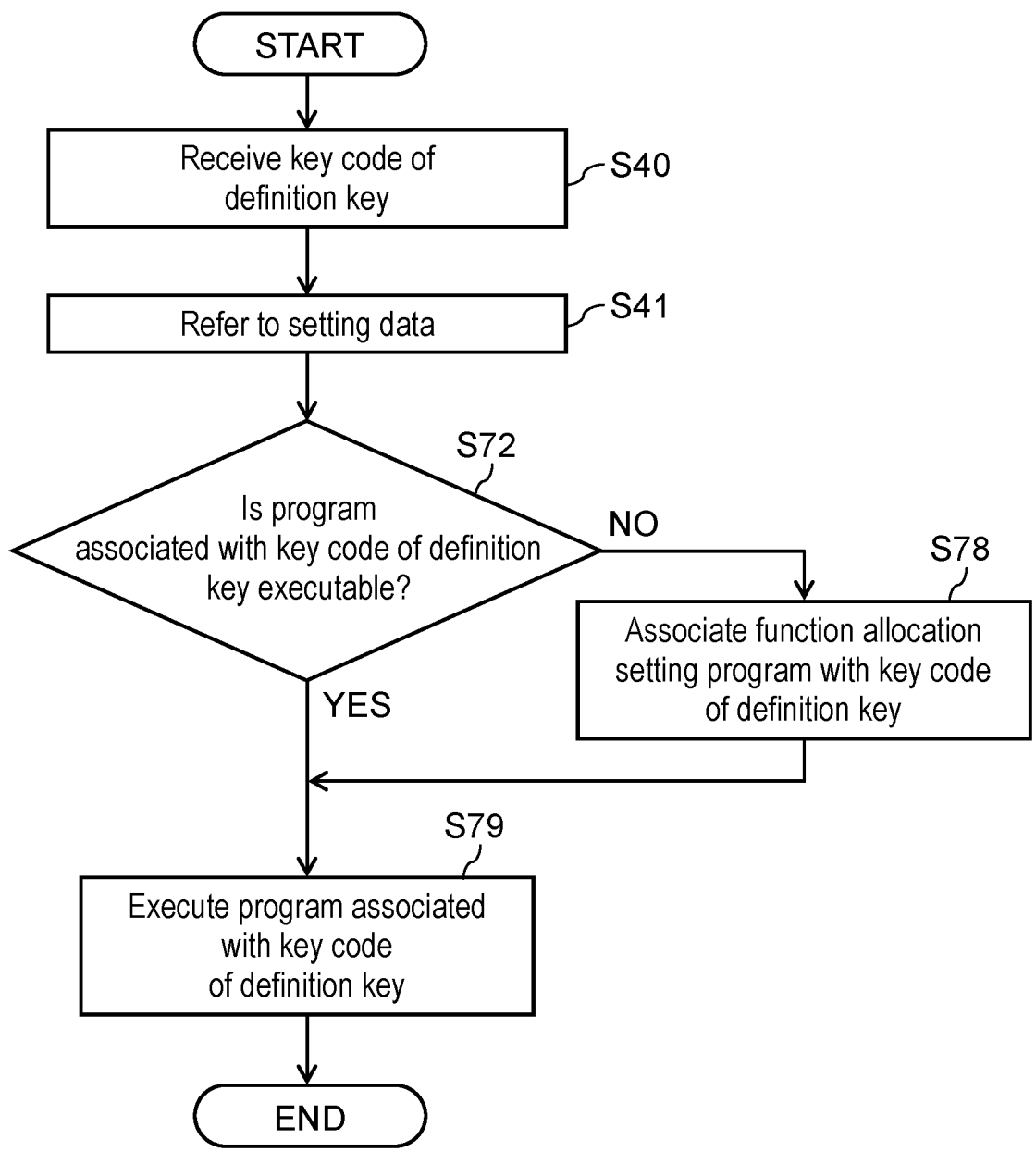
FIG. 7A is a flowchart illustrating an example of operation of a video output apparatus according to a second exemplary embodiment.

When receiving an operation signal indicating a code (key code) according to an operation on definition key 20, video output apparatus 100 in the second exemplary embodiment executes a series of processes illustrated in a flowchart shown in FIG. 7A.

The flowchart shown in FIG. 7A illustrates an example of operation of video output apparatus 100 according to the second exemplary embodiment. Processes that are substantially the same as the processes in steps in the flowchart shown in FIG. 4 in the first exemplary embodiment are given identical step numbers and will not be described in detail.

Operation signal processor 110 receives an operation signal output from operation device 120 and indicating a code (key code) (step S40).

Operation signal processor 110 receiving the operation signal accesses to storage 130 to refer to the setting data illustrated in FIG. 3 as one example (step S41).

Operation signal processor 110 acquires, from the setting data, information indicating a program associated with the code (key code) indicated by the received operation signal. For example, operation signal processor 110 refers to the setting data illustrated in FIG. 3 as one example, and acquires information (information indicating the program) included in the row corresponding to the code (key code) indicated by the received operation signal in the setting data.

Operation signal processor 110 determines whether the program associated with the code (key code) is executable or not (step S72).

In step S72, operation signal processor 110 determines whether the program is stored in storage 130 based on the information indicating the program. When operation signal processor 110 determines that the program is not stored in storage 130, operation signal processor 110 determines that this program is not executable (NO in step S72). When operation signal processor 110 determines that the program is stored in storage 130, operation signal processor 110 determines that the program is executable (YES in step S72).

Operation signal processor 110 may also determine whether the program is compatible with an operation system of video output apparatus 100 in step S72. Operation signal processor 110 may acquire the result of determination, which is made by other programs (for example, the operation system of video output apparatus 100), regarding whether the program is compatible with the operation system of video output apparatus 100. Operation signal processor 110 may determine that this program is not executable, when operation signal processor 110 determines that the program is not compatible with the operation system of video output apparatus 100 (NO in step S72). Further, operation signal processor 110 may determine that this program is executable, when operation signal processor 110 determines that the program is compatible with the operation system of video output apparatus 100 (YES in step S72).

When operation signal processor 110 determines that the program is executable in step S72 (YES in step S72), operation signal processor 110 executes the program associated with the code (key code) corresponding to definition key 20 (step S79).

When operation signal processor 110 determines that the program is not executable in step S72 (NO in step S72), operation signal processor 110 associates the function allocation setting program to the code (key code) corresponding to definition key 20 (step S78).

In step S78, the initial association is restored in the setting data stored in storage 130. Subsequent to step S78, operation signal processor 110 executes the program associated with the code (key code) (S79). Specifically, the function allocation setting program is executed in step S79 after the execution of step S78.

In video output apparatus 100 configured as described above in the second exemplary embodiment, when definition key 20 is pressed while the program associated with definition key 20 cannot be executed for some reason, the operation image for allocating a function to definition key 20 as illustrated in FIG. 5A is displayed in display device 150. This configuration can improve convenience for a user when the program associated with definition key 20 cannot be executed.

Note that, in addition to the operation image illustrated in FIG. 5A, information indicating the reason for the display of the operation image may be displayed in display device 150. Thus, convenience for the user can be further improved.

[2-3. Modification]

In video output apparatus 100 in the second exemplary embodiment, the operation for executing the function allocation setting program when the program associated with definition key 20 cannot be executed is not limited to the operation described above.

For example, the flowchart illustrated in FIG. 7A shows an operation example in which, when operation signal processor 110 determines that the program associated with definition key 20 cannot be executed in step S72 (NO in step S72), operation signal processor 110 associates the function allocation setting program to the code (key code) corresponding to definition key 20 in subsequent step S78. However, the present disclosure is not limited to this operation example.

For example, when operation signal processor 110 determines that the program associated with definition key 20 cannot be executed in step S72, operation signal processor 110 may execute the function allocation setting program without associating the function allocation setting program with the code (key code) corresponding to definition key 20 in the subsequent step. The present modification describes such an operation example with reference to FIG. 7B.

Figure 7B:
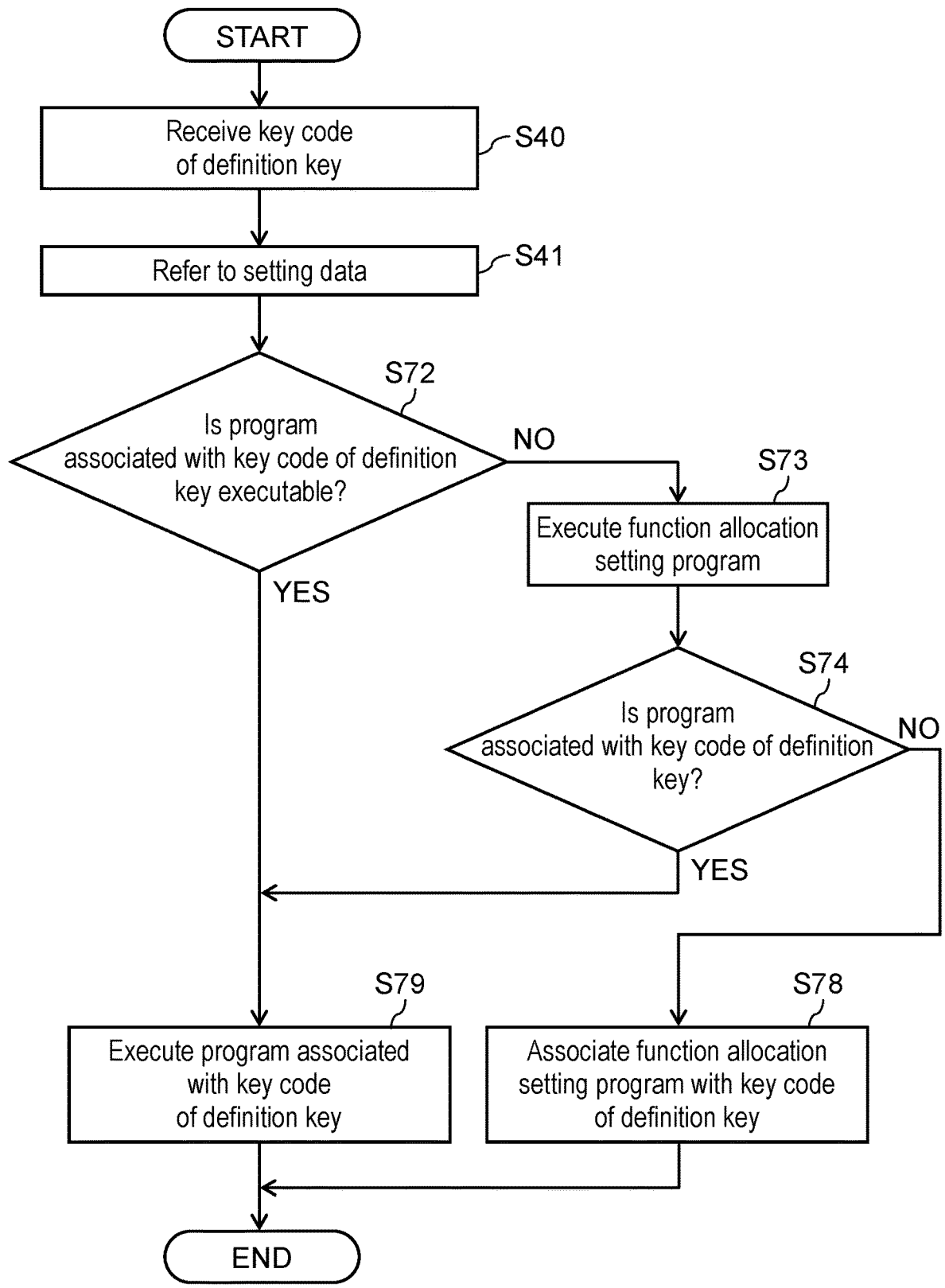
FIG. 7B is a flowchart illustrating an example of operation of a video output apparatus according to a modification of the second exemplary embodiment.

FIG. 7B is a flowchart illustrating an example of operation of a video output apparatus according to the modification of the second exemplary embodiment.

Processes in steps S40, S41, S72, S78, and S79 in the flowchart shown in FIG. 7B are substantially the same as the processes in steps with the same step number in the flowchart shown in FIG. 7A, and will not be described in detail below.

When operation signal processor 110 determines that the program associated with definition key 20 cannot be executed in step S72 (NO in step S72), operation signal processor 110 executes the function allocation setting program (step S73).

When the process in step S73 is executed, the operation image illustrated in FIG. 5A is displayed in display device 150.

Operation signal processor 110 determines whether one of the plurality of functions displayed in the operation image is associated with definition key 20 (step S74).

When operation signal processor 110 determines that one of the plurality of functions displayed in the operation image is associated with definition key 20 in step S74 (YES in step S74), operation signal processor 110 executes a program for achieving the function associated with the code (key code) corresponding to definition key 20 (step S79).

When operation signal processor 110 determines that none of the plurality of functions displayed in the operation image is associated with definition key 20 in step S74 (NO in step S74), operation signal processor 110 associates the function allocation setting program with the code (key code) corresponding to definition key 20 (step S78).

The subsequent processes are substantially the same as the processes in the flowchart shown in FIG. 7A, and will not be described in detail.

The flowchart illustrated in FIG. 7A shows an operation example in which the process in step S79 is executed after the process in step S78. On the other hand, in the flowchart illustrated in FIG. 7B, the process in step S79 may not be executed after the process in step S78, because the function allocation setting program is already executed in step S78.

Note that step S78 may be skipped in the flowchart shown in FIG. 7B. In this case, when NO determination is made in step S74, the function allocation setting program is not associated with the code (key code) corresponding to definition key 20 (that is, the setting data stored in storage 130 is unchanged). Therefore, when definition key 20 is pressed again, the processes in step S40 and subsequent steps are again executed.

It is to be noted that, as in the modification of the first exemplary embodiment, when the initial association is performed in the program specifying the process upon receipt of an operation signal, NULL may be associated with the code (key code) corresponding to definition key 20 (NULL may be input in the "function/program" field of data row R10 (see FIG. 3), for example) in the setting data stored in storage 130, in step S78 in the flowchart shown in FIG. 7B.

[2-4. Effects]

As described above, in the video output apparatus in the second exemplary embodiment, when receiving an operation signal indicating the definition operation part code, the operation signal processor may determine whether the program associated with the definition operation part code is stored in the storage. When the operation signal processor determines that the program associated with the definition operation part code is not stored in the storage, the operation signal processor may execute the function allocation setting program.

For example, in video output apparatus 100 described in the second exemplary embodiment, operation signal processor 110 determines whether the program associated with the definition operation part code is executable, when receiving an operation signal indicating the definition operation part code that is the code according to the operation on the definition operation part (for example, definition key 20) of operation device 120 (for example, remote controller 200). Operation signal processor 110 determines, for example, whether this program is stored in storage 130 to determine whether this program is executable. When operation signal processor 110 determines that the program associated with the definition operation part code is not stored in storage 130, operation signal processor 110 executes the function allocation setting program.

In video output apparatus 100 configured as described above, when the program for achieving the function allocated to definition key 20 is uninstalled by the user, for example, and cannot be executed, the operation image due to the function allocation setting program is displayed in display device 150 in response to the depression of definition key 20. The user seeing the operation image displayed in display device 150 in response to, for example, the depression of definition key 20 can recognize that the allocation of the function to definition key 20 is invalid. Then, the user can allocate a desired function of video output apparatus 100 to definition key 20 again with the operation image. Thus, convenience for the user can be further improved.

In addition, in the video output apparatus in the second exemplary embodiment, when the program associated with the definition operation part code is not stored in the storage, the operation signal processor may associate the function allocation setting program with the definition operation part code.

For example, in video output apparatus 100 described in the second exemplary embodiment, when the program associated with the definition operation part code is non-executable because it is not stored in storage 130, for example, operation signal processor 110 associates the function allocation setting program with the definition operation part code.

Such an association may be performed with the setting data illustrated in FIG. 3 or may be performed on a program.

In video output apparatus 100 configured as described above, when the program for achieving the function allocated to definition key 20 is uninstalled by the user, for example, and cannot be executed, the operation image due to the function allocation setting program is displayed in display device 150 in response to the depression of definition key 20. The user seeing the operation image displayed in display device 150 in response to, for example, the depression of definition key 20, can recognize that the allocation of the function to definition key 20 is invalid. Then, the user can allocate a desired function of video output apparatus 100 to definition key 20 again with the operation image. Thus, convenience for the user can be further improved.

This effect is obtained when video output apparatus 100 provided with display device 150 displays the operation image in display device 150. This effect is also obtained when video output apparatus 100 displays the operation image in display device 150 provided to external display apparatus 155.

Other Exemplary Embodiments

The first and second exemplary embodiments and the modifications have been described above as illustrations of the technique disclosed in the present application. However, the technique in the present disclosure is not limited to these exemplary embodiments and modifications, and is also applicable to other exemplary embodiments including appropriate modifications, substitutions, additions, or omissions. In addition, a new exemplary embodiment can be made by combining constituents described in the above first and second exemplary embodiments and modifications.

Accordingly, some other exemplary embodiments will be described below.

The first and second exemplary embodiments and the modifications show a configuration example in which a single independent operation part such as definition key 20 is used as the definition operation part. However, the present disclosure is not limited to this configuration.

For example, single remote controller 200 described as an example of operation device 120 may have a plurality of definition keys 20.

Alternatively, an operation part that enables video output apparatus 100 to perform a predetermined operation may function as the definition operation part when a user performs a predetermined operation on the operation part. If the operation part is a key, examples of the predetermined operation include holding down a key, pressing a key repeatedly in a short cycle, pressing a plurality of keys in a predetermined order, pressing predetermined keys simultaneously, and a combination of such operations. If the operation part is a trackpad or a touch screen, examples of the predetermined operation include gesture input such as swipe on the operation part, holding down the operation part, touching the operation part more than once, and a combination of such operations. Further, the predetermined operation may be defined by the user. Specifically, video output apparatus 100 may be configured such that a single program is associated with a single code (key code) or one of permutations (for example, repeated permutations) of a plurality of consecutive codes (a plurality of key codes) according to the predetermined operation described above.

When the user allocates a function to a predetermined operation and then, a program for achieving the function cannot be executed, the function allocation setting program may be started in video output apparatus 100 that receives the code (key code) corresponding to the predetermined operation. When the predetermined operation is defined as an initial setting of video output apparatus 100, the function allocation setting program may be associated with the predetermined operation as the initial association.

Each of the components in the first and second exemplary embodiments and the modifications may be configured with dedicated hardware (electronic circuit) or implemented by a software program suitable for each component using a processor. Each component may be implemented by a program execution unit, such as a central processing unit (CPU) or a processor, reading and executing a software program recorded in a recording medium such as a hard disk or a semiconductor memory.

In the exemplary embodiments, division of functional blocks in each of the block diagrams is merely an example. For example, a plurality of functional blocks may be implemented as one functional block, one functional block may be divided into a plurality of functional blocks, or a part of the functions may be transferred to another functional block. Further, functions of a plurality of functional blocks may be processed in parallel or in a time-sharing manner by single piece of hardware or software.

Further, computer-readable recording media in which the software program is recorded are included in the scope of the present disclosure. Examples of such computer-readable recording media include flexible disks, hard disks, compact disk read-only memories (CD-ROMs), magneto-optical disks (MOs), digital versatile disks (DVDs), DVD-ROMs, DVD-RAMs, Blu-ray (registered trademark) discs (BDs), and semiconductor memories. The computer program is not limited to computer programs recorded in the recording media mentioned above, but may be transmitted through, for example, an electrical communication line, a wireless or wired communication line, or a network represented by the Internet.

A part or all of the components constituting the above-described devices may be configured with an integrated circuit (IC) card detachable from each of the devices, or a single module.

A part or all of the components constituting the above devices may be configured with a single-chip large scale integration (LSI).

Each processor is not limited to LSI or IC, but may be configured with a dedicated circuit or a general-purpose processor. Alternatively, each processor may be configured with a field programmable gate array (FPGA) in which a circuit configuration is programmable or a reconfigurable processor that allows reconfiguration of circuit cell connections and settings within an LSI.

The software program may be recorded in a recording medium and distributed or circulated. For example, the distributed software program is installed in devices and executed by processors of the devices. In this way, the devices can execute various processes.

The computer program or the digital signals of the present disclosure may be transmitted through, for example, an electrical communication line, a wireless or wired communication line, a network such as the Internet, and data broadcasting.

The present disclosure may be achieved on another independent computer system by the program or digital signals being recorded in a recording medium and being transported, or by the program or digital signals being transferred over the network or the like.

In the exemplary embodiments, each process (each function) may be achieved by centralized processing performed by a single device (system) or distributed processing performed by a plurality of devices.

Note that the order in which steps in the flowcharts illustrated in the drawings in the exemplary embodiments are executed is merely an example. Steps may be executed in order different from the orders described in the exemplary embodiments. Furthermore, some of the above steps may be executed simultaneously (in parallel) with the other steps.

The exemplary embodiments and the modifications have been described above as illustrations of the technique disclosed in the present disclosure. For this purpose, the accompanying drawings and the detailed description have been provided.

Accordingly, the components described in the accompanying drawings and the detailed description may not only include components that are essential for solving the problems, but may also include components that are not essential for solving the problems in order to illustrate the technique. It should not be therefore determined that the unessential components in the accompanying drawings and the detailed description are essential only based on the fact that these components are included in the drawings and the description.

The above exemplary embodiments are provided to exemplify the technique according to the present disclosure, and thus various changes, replacements, additions, omissions, and the like can be made within the scope of the claims and equivalents thereof.

INDUSTRIAL APPLICABILITY

The present disclosure is applicable to a video output apparatus that is operated with an operation part to which a function can be allocated. Specifically, the present disclosure is applicable to television receivers, video players, video

REFERENCE MARKS IN THE DRAWINGS 100, 100A, 100B, 100C, 100D: video output apparatus
110: operation signal processor
111: microcontroller
112: computing device
120: operation device
130: storage
150, 210B: display device
155: display apparatus
20, 20A, 20B: definition key
200, 200A, 200B: remote controller
22A, 22B: key
24A, 24B: key
26A, 26B: key
R10: data row

The invention claimed is:

1. A video output apparatus comprising:
an operation device that outputs an operation signal according to an operation;
an operation signal processor that executes a process according to the operation signal upon receipt of the operation signal; and
a storage that stores a plurality of programs for achieving a plurality of functions, and an association between the operation signal and any of the plurality of programs,
wherein the operation device includes a definition operation part to which a function achieved by any of the plurality of programs is allocatable,
the plurality of programs includes a function allocation setting program for outputting an operation image, the operation image being for allocating the function to the definition operation part,
the storage stores, as an initial association, an association between an operation signal due to an operation on the definition operation part and the function allocation setting program, and
the operation signal processor executes the function allocation setting program based on the initial association and outputs the operation image, upon receipt of the operation signal output from the operation device due to the operation on the definition operation part.

2. The video output apparatus according to claim 1, wherein
the operation signal processor determines whether a program associated with the operation signal is stored in the storage or not upon receipt of the operation signal due to the operation on the definition operation part, and
executes the function allocation setting program when determining that the program is not stored in the storage.

3. The video output apparatus according to claim 2, wherein the operation signal processor associates the function allocation setting program with the operation signal that is due to the operation on the definition operation part, when determining that the program is not stored in the storage.

4. The video output apparatus according to claim 1, further comprising a display device that displays a video, wherein the operation image is displayed in the display device.

5. The video output apparatus according to claim 1, wherein when the operation signal due to the operation on the definition operation part is associated with a program other than the function allocation setting program, the operation signal processor visually shows in the operation image that a function achieved by the program associated with the definition operation part is allocated to the definition operation part.

6. A video output method for outputting an operation image, the method being executed by a video output apparatus including:
an operation device that outputs an operation signal according to an operation and includes a definition operation part to which a function achieved by any of a plurality of programs is allocatable;
an operation signal processor that executes a process according to the operation signal upon receipt of the operation signal; and
a storage that stores a plurality of programs including a function allocation setting program for outputting an operation image, and an association between the operation signal and any of the plurality of programs, the operation image being for allocating the function to the definition operation part,
wherein the storage stores, as an initial association, an association between an operation signal due to an operation on the definition operation part and the function allocation setting program, and
the operation signal processor executes the function allocation setting program based on the initial association and outputs the operation image, upon receipt of the operation signal output from the operation device due to the operation on the definition operation part.

* * * * *